United States Patent
Ebner et al.

(10) Patent No.: US 8,842,324 B1
(45) Date of Patent: Sep. 23, 2014

(54) METHOD AND DEVICE FOR ACCURATELY ESTIMATING POWER CONSUMPTION

(71) Applicant: Xerox Corporation, Norwalk, CT (US)

(72) Inventors: Fritz Francis Ebner, Pittsford, NY (US); Lina Fu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 24 days.

(21) Appl. No.: 13/799,306

(22) Filed: Mar. 13, 2013

(51) Int. Cl.
*G06F 3/12* (2006.01)

(52) U.S. Cl.
CPC .................................. *G06F 3/1294* (2013.01)
USPC ....................................................... 358/1.15

(58) Field of Classification Search
None
See application file for complete search history.

(56) References Cited

U.S. PATENT DOCUMENTS

| | | | |
|---|---|---|---|
| 6,785,748 B2 * | 8/2004 | Mikuni et al. | 710/15 |
| 6,903,832 B2 * | 6/2005 | Maekawa et al. | 358/1.14 |
| 8,180,934 B2 * | 5/2012 | Nomura | 710/19 |
| 2004/0024483 A1 * | 2/2004 | Holcombe | 700/122 |
| 2009/0287855 A1 * | 11/2009 | Nomura | 710/19 |
| 2010/0103824 A1 * | 4/2010 | Gilmour | 370/245 |
| 2013/0096893 A1 * | 4/2013 | Ebner | 703/6 |

* cited by examiner

*Primary Examiner* — Mark Zimmerman
*Assistant Examiner* — Lawrence Wills
(74) *Attorney, Agent, or Firm* — Fox Rothschild LLP

(57) ABSTRACT

A device and method for estimating power consumption at a printing device. The device includes a processor and memory containing a set of instructions, the instructions configured to cause the device to perform the method. The method includes polling the printing device at a plurality of intervals over a first period of time and receiving a polling for at each of the plurality of intervals. The method further includes determining a page count difference between each poll and determining a timer count between each poll. An estimated energy consumption for the printing device is determined based upon the page count difference for each of the intervals and the timer count for each of the intervals. A total estimated energy is determined for the first period of time based upon the estimated energy consumption of the printing device for each of the intervals.

16 Claims, 4 Drawing Sheets

202

| Time Period | J A Estimation | 1 min Polling | 10 min Polling | 30 min Polling | 60 min Polling | 120 min Polling |
|---|---|---|---|---|---|---|
| 06-Nov-2011 to 13-Nov-2011 | 6 | -0.01 | -0.03 | -0.04 | -0.18 | -0.3 |
| 13-Nov-2011 to 20-Nov-2011 | 6.05 | -0.02 | -0.05 | -0.07 | -0.21 | -0.3 |
| 20-Nov-2011 to 27-Nov-2011 | 6.38 | -0.01 | -0.02 | -0.02 | -0.11 | -0.16 |
| 27-Nov-2011 to 04-Dec-2011 | 6.43 | -0.03 | -0.06 | -0.08 | -0.2 | -0.3 |
| 04-Dec-2011 to 11-Dec-2011 | 6.34 | -0.02 | -0.04 | -0.07 | -0.21 | -0.31 |
| 11-Dec-2011 to 18-Dec-2011 | 5.94 | -0.01 | -0.04 | -0.06 | -0.21 | -0.32 |
| 18-Dec-2011 to 25-Dec-2011 | 4.32 | 0 | -0.02 | -0.03 | -0.12 | -0.22 |
| 25-Dec-2011 to 01-Jan-1012 | 3.02 | 0.01 | 0.01 | 0 | -0.01 | -0.02 |
| 01-Jan-1012 to 08-Jan-2012 | 5.13 | 0 | -0.02 | -0.03 | -0.15 | -0.24 |
| 08-Jan-1012 to 15-Jan-2012 | 5.48 | 0 | -0.01 | -0.04 | -0.16 | -0.25 |
| 15-Jan-1012 to 22-Jan-2012 | 5.83 | -0.02 | -0.04 | -0.06 | -0.23 | -0.32 |

*FIG. 2A*

METHOD AND DEVICE FOR ACCURATELY ESTIMATING POWER CONSUMPTION

BACKGROUND

The present disclosure relates to estimating power consumption. More specifically, the present disclosure relates to estimating power consumption for a print device.

Energy consumption reporting and control for a device, such as an office device, is becoming more interesting to consumers. As electricity becomes more expensive, and consumers strive to become more environmentally conscious, accurate power consumption and modeling is becoming more important.

Many office devices such as printers, copiers and multi-function devices (e.g., a single device capable of scanning, printing, faxing and/or copying) are capable of operating in one or more states. For example, when a device is not used for a given period of time, the device may enter a "sleep" state. During a sleep state, various components in the device go into low power operation or are turned off completely. Once the device receives a request to perform a specific function, the device may exit the sleep state and operate as normal.

Existing techniques for energy estimation use a variety of methods, each having differing accuracy and precision. Many estimation techniques require polling a device to acquire job arrival data, and using some form of power model to describe the devices characteristics such as energy used during various states, and the energy used by a device to transition between the states. However, in some instances, information related to specific job information will not be available, and the existing polling approaches will not be sufficient for accurate results.

SUMMARY

In one general respect, the embodiments disclose a method of estimating power consumption at a printing device. The method includes polling the printing device at a plurality of intervals over a first period of time, receiving a polling response from the printing device for at each of the plurality of intervals, determining a page count difference between each poll for each of the plurality of intervals, determining a timer count between each poll for each of the plurality of intervals, determining an estimated energy consumption of the printing device for each of the plurality of intervals based upon the page count difference for each of the plurality of intervals and the timer count for each of the plurality of intervals, and determining a total estimated energy consumption of the printing device for the first period of time based upon the estimated energy consumption of the printing device for each of the plurality of intervals.

In another general respect, the embodiments disclose device for estimating power consumption at a printing device. The device includes a processor and a non-transitory computer readable medium operably connected to the processor. The computer readable medium includes a set of instructions configured to instruct the processor to poll the printing device at a plurality of intervals over a first period of time, receive a polling response from the printing device for at each of the plurality of intervals, determine a page count difference between each poll for each of the plurality of intervals, determine a timer count between each poll for each of the plurality of intervals, determine an estimated energy consumption of the printing device for each of the plurality of intervals based upon the page count difference for each of the plurality of intervals and the timer count for each of the plurality of intervals, and determine a total estimated energy consumption of the printing device for the first period of time based upon the estimated energy consumption of the printing device for each of the plurality of intervals.

BRIEF DESCRIPTION OF THE DRAWINGS

FIG. 2A depicts a sample set of results according to an embodiment.

DETAILED DESCRIPTION

Figure 1:
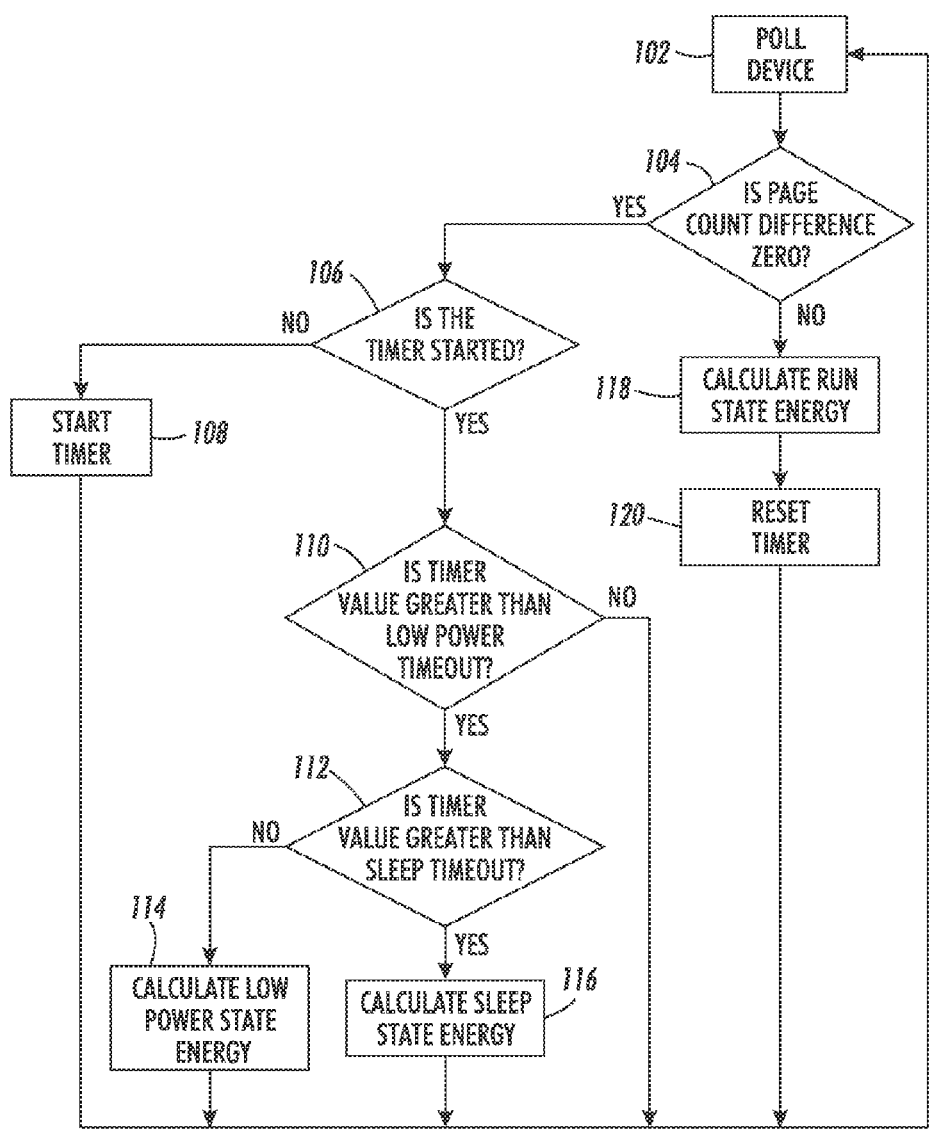
FIG. 1 depicts a sample flow diagram of a method for estimating device power consumption according to an embodiment.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "device" refers to an electronic device configured to perform one or more specific functions. Each device has an associated power model that defines the device's power consumption during certain states as well as the device's power consumption during transitions between certain states.

A "power model" is an estimated representation of power usage for a specific device. If the device is a multifunction device configured to operate in multiple states, the power model includes power consumption levels for each of the multiple states as well as power consumption information for transitioning between from one state to another. A power model may be provided by the manufacturer of a device, or determined by measuring the power consumption of the device as it operates.

A "printing device" is an electronic device that is capable of receiving commands, and/or printing text characters and/or images on a substrate, and/or scanning images. Printing devices may include, but are not limited to, network printers, production printers, copiers and other devices using ink or toner, and scanners. A printing device may also perform a combination of functions such as printing and scanning, in which case such a device may be considered a multifunctional device.

A "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

The present disclosure is directed to a method of estimating power consumption at a device, such as an office printing device, that can be performed in the absence of job accounting logs to provide an accurate estimate of energy consumption. Typical printing devices spend a large percentage of time in lower power states such as idle or sleep states, having a typically less than 10% utilization rate. The method and process as described herein provide an estimation technique that includes low power state energy consumption into its power estimate, even though the state status cannot be found directly from the device (i.e., the device does not provide a job accounting log). This allows for a much smaller estimation error for print devices that do not provide a job accounting log.

FIG. 1 depicts a sample process for estimating the power consumption of a printing device. It should be noted that the process as shown in FIG. 1 is directed to a print device by way of example only.

Initially, a processing device such as a monitoring computer polls 102 the print device, and receives a response from the print device. In this example, the response may include a page count associated with the print device. The processing device may also have additional information related to the print device such as power state energy (based upon a manufacturer-provided power model) for each state the print device operates in. The processing device may also have access to information associated with a timeout value to a low power state for the print device (i.e., how long does the device take to enter a low power state) and a timeout value for a sleep state for the device (i.e., how long does the device take to enter a sleep state). Additionally, the processing device may have one or more timers associated with the polling of the print device.

After receiving a polling response from the print device, the processing device may determine 104 if the page count difference is zero between this poll 102 and an immediately previous poll. If the processing device determined 104 the difference is zero, the processing device may determine 106 if a timer associated with the print device is started. If the timer is not started (e.g., this is the first time the processing device has polled 102 the print device), the processing device may start 108 the timer. The process returns to the start and the processing device may poll 102 the print device again after an elapsed interval of time (e.g., after 30 minutes).

Conversely, if the processing device determines 106 the timer is started, the processing device may further analyze and compare the timer value against the timeout values for the print device to determine a potential state of the device. For example, the processing device may determine 110 if the timer value is greater than the low power timeout for the print device (e.g., is the timer value greater than the time required for the print device to enter a low power state like an idle state). If the processing device determines 110 the timer count is not greater than the low power timeout, the process may return to the start and the processing device may poll 102 the print device again after an elapsed interval of time (e.g., after 30 minutes).

If the processing device does determine 110 the timer value is greater than the low power timeout, the processing device may further determine 112 if the timer value is greater than the sleep timeout for the print device (e.g., if the timer value greater than the time required for the print device to enter a sleep state). If the processing device determines 110 the timer values is greater than the low power timeout, but it also determines 112 that the timer value is not greater than the sleep timeout, the processing device may calculate 114 the energy consumed by the print device during that polling interval based upon the low power state energy values for the print device as indicated in the print device's power model. Alternatively, if the processing device does determine 112 that the timer value is greater than the sleep timeout, the processing device may calculate 116 the energy consumed by the print device during that polling interval based upon the sleep state energy values for the print device as indicated in the print device's power model.

If, after polling 102, the processing device determines 104 the page count difference does not equal zero, the processing device may calculate 118 a run state energy for that polling interval. A non-zero page count difference indicates that the print device was actively processing at least one print job during that polling interval. To calculate 118 a run state energy, the processing device may determine the run power based upon average power used by the print device during an active state as well as volume of pages printed and the device's page per minute capabilities. Also, as mentioned above, a print device spends a large percentage of time in an idle state, so the processing device may bias the run state energy to include a portion of idle time as well. For example, the processing device may add the idle state energy and the average power of run energy used during active states, and then may divide the sum by the polling interval time to calculate 118 an run time that averages idle time and active state time over the polling period. The processing device may reset 120 the timer and poll 102 the print device again.

The process as shown in FIG. 1 may be repeated multiple times over a specific time period in order to accurately estimate the energy consumption at the print device. For example, the polling process may be repeated every 30 minutes for a week. Alternatively, the polling process may be repeated every 5 minutes for 24 hours depending on the availability of the monitoring computer and the overall usage statistics of the print device.

It should be noted that the process as shown in FIG. 1 is shown by way of example only, and additional changes and/or variations to the process may be made. For example, a print device may be defaulted to never go into sleep mode. As such, the process may be adapted to eliminate determining 112 if the timer value is greater than a sleep value. Rather, the process may default to calculating 114 low power state energy for the print device any time the timer value is greater than the low power timeout.

Figure 2B:
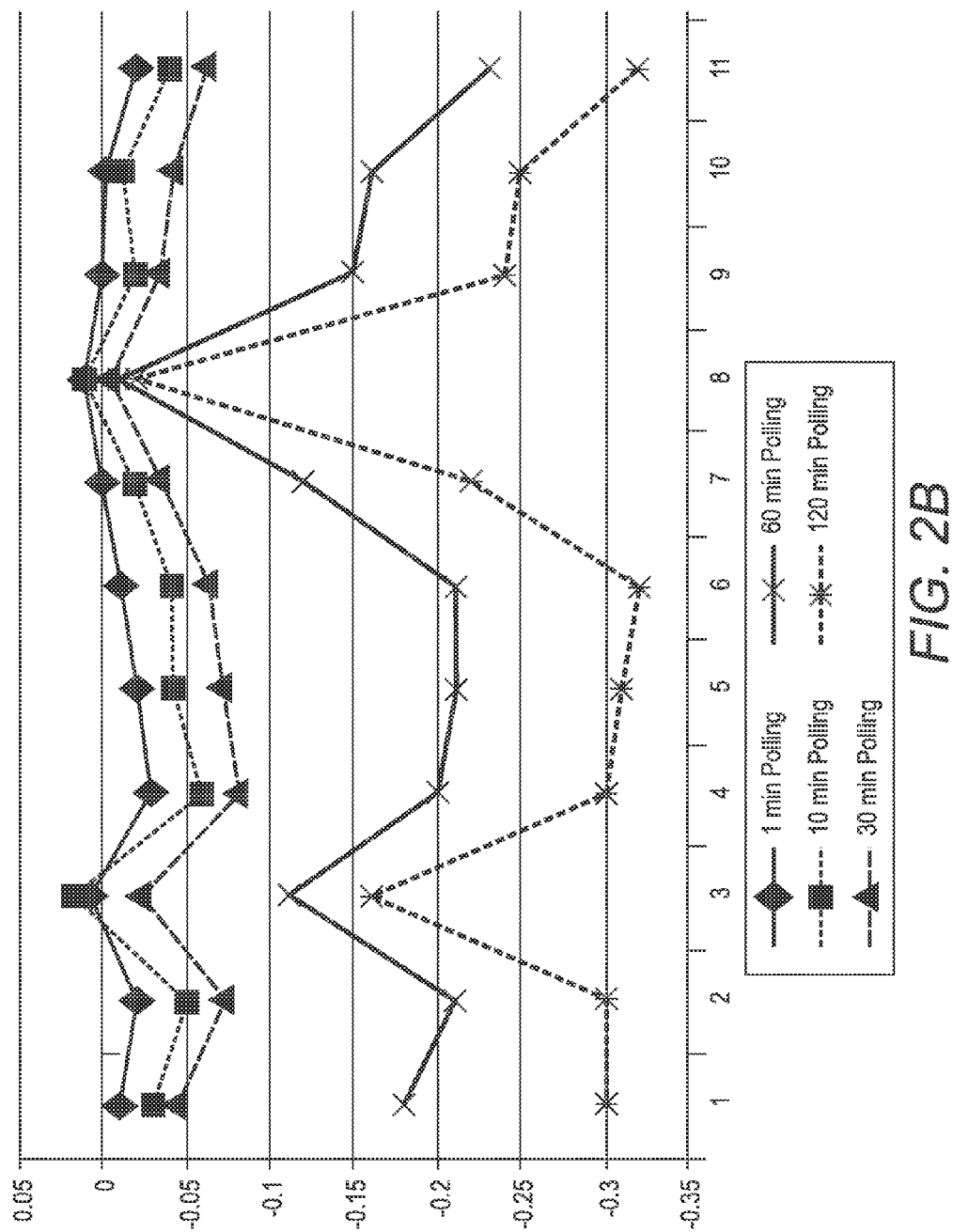
FIG. 2B depicts a graph of the results as shown in FIG. 2A.

In the above described process, the frequency of polling may directly impact the accuracy of the results. For example, polling at a greater frequency (e.g., every one minute) may provide more accurate results than polling at a lower frequency (e.g., every 120 minutes). However, polling at a greater frequency may require additional resources at the monitoring computer, thus reducing the overall efficiency of the estimation technique. FIGS. 2A and 2B illustrate a sample set of data obtained over a series of polling periods. As shown in chart 202 and the graph in FIG. 2B, the accuracy for 1 minute polling is higher than for 120 polling. However, depending on the tolerances and accepted error of the estimation technique, a polling frequency between the two extremes may be acceptable. For example, a 10% error rate may be acceptable. In this example, the 30 minutes polling frequency may be acceptable. By using a lower polling frequency like 30 minutes, the overall resources used at the monitoring computer are reduced.

It should be noted that the data shown in FIGS. 2A and 2B is shown by way of example only, and based upon the individual types of devices being polled the polling data may vary accordingly.

Figure 3:
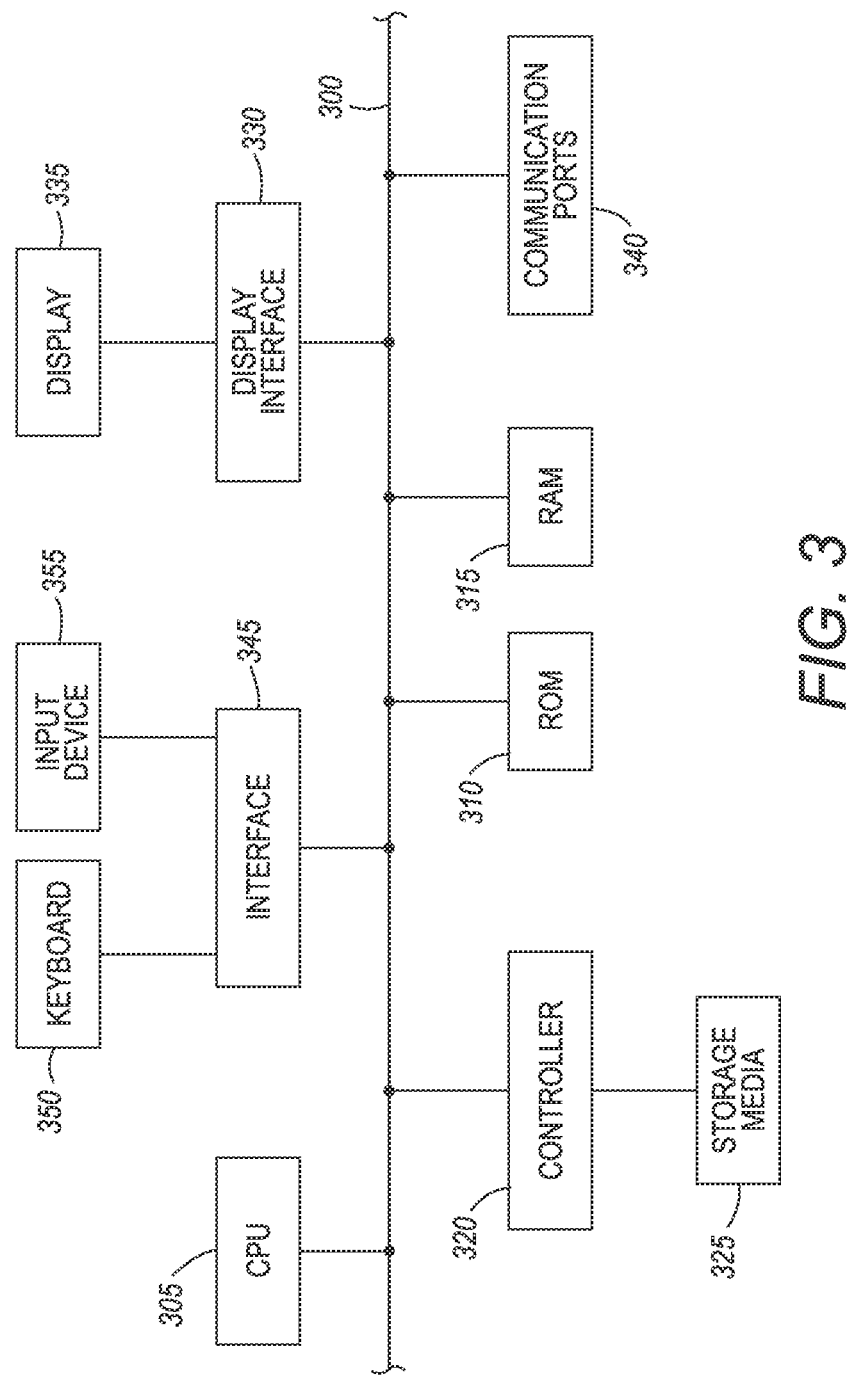
FIG. 3 depicts various embodiments of a computing device for implementing the various methods and processes described herein.

FIG. 3 depicts a block diagram of internal hardware that may be used to contain or implement the various methods and processes as discussed above. An electrical bus 300 serves as the main information highway interconnecting the other illustrated components of the hardware. CPU 305 is the central processing unit of the system, performing calculations and logic operations required to execute a program. For example, CPU 305 may perform the functions performed by the processing device in the above discussion of FIG. 1. CPU 305, alone or in conjunction with one or more of the other elements disclosed in FIG. 3, is a processing device, computing device or processor as such terms are used within this disclosure. Read only memory (ROM) 310 and random access memory (RAM) 315 constitute examples of memory devices.

A controller 320 interfaces with one or more optional memory devices 325 to the system bus 300. These memory devices 325 may include, for example, an external or internal DVD drive, a CD ROM drive, a hard drive, flash memory, a USB drive or the like. As indicated previously, these various drives and controllers are optional devices. Additionally, the memory devices 325 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 310 and/or the RAM 315. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 330 may permit information from the bus 300 to be displayed on the display 335 in audio, visual, graphic or alphanumeric format. Communication with external devices may occur using various communication ports 340. A communication port 340 may be attached to a communications network, such as the Internet or a local area network.

The hardware may also include an interface 345 which allows for receipt of data from input devices such as a keyboard 350 or other input device 355 such as a mouse, a joystick, a touch screen, a remote control, a pointing device, a video input device and/or an audio input device.

It should be noted that multifunction printing device as described above is provided by way of example only. The techniques and processes as taught herein may be applied to additional devices that have varying levels of power consumption based upon their state of operation.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of estimating power consumption at a printing device, the method comprising:
   polling, by a processing a device, the printing device at a plurality of intervals over a first period of time;
   receiving, at the processing device, a polling response from the printing device for at each of the plurality of intervals;
   determining, by the processing device, a page count difference between each poll for each of the plurality of intervals;
   determining, by the processing device, a timer count between each poll for each of the plurality of intervals;
   determining, by the processing device, an estimated energy consumption of the printing device for each of the plurality of intervals based upon the page count difference for each of the plurality of intervals and the timer count for each of the plurality of intervals; and
   determining, by the processing device, a total estimated energy consumption of the printing device for the first period of time based upon the estimated energy consumption of the printing device for each of the plurality of intervals.

2. The method of claim 1, wherein the polling response comprises a page count for a specific interval.

3. The method of claim 2, wherein determining the page count difference comprises comparing, by the processing device, the page count for a specific time interval against the page count for a previous time interval.

4. The method of claim 3, wherein determining the timer count comprises comparing, by the processing device, the timer count for a specific time interval against the timer count for a previous time interval.

5. The method of claim 4, wherein if the page count difference does not equal zero, resetting, by the processing device, the timer count to zero.

6. The method of claim 4, wherein determining the estimated energy consumption of the printing device for each of the plurality of intervals comprises:
   for each interval where the page count difference does not equal zero, determining, by the processing device, a run state energy for the printing device.

7. The method of claim 6, wherein determining the estimated energy consumption of the printing device for each of the plurality of intervals comprises:
   for each interval where the page count difference equals zero, determining, by the processing device, a low power state energy for the printing device if the timer count is above a low power state timeout and is below a sleep state timeout.

8. The method of claim 7, wherein determining the estimated energy consumption of the printing device for each of the plurality of intervals comprises:
   for each interval where the page count difference equals zero, determining, by the processing device, a sleep state energy for the printing device if the timer count is above the sleep state timeout.

9. A device for estimating power consumption at a printing device, the device comprising:
   a processor; and
   a non-transitory computer readable medium operably connected to the processor, the computer readable medium containing a set of instructions configured to instruct the processor to:
      poll the printing device at a plurality of intervals over a first period of time,
      receive a polling response from the printing device for at each of the plurality of intervals,
      determine a page count difference between each poll for each of the plurality of intervals,
      determine a timer count between each poll for each of the plurality of intervals,
      determine an estimated energy consumption of the printing device for each of the plurality of intervals based upon the page count difference for each of the plurality of intervals and the timer count for each of the plurality of intervals, and
      determine a total estimated energy consumption of the printing device for the first period of time based upon the estimated energy consumption of the printing device for each of the plurality of intervals.

10. The device of claim 9, wherein the polling response comprises a page count for a specific interval.

11. The device of claim 10, wherein the instructions for determining a page count difference further comprise instructions configured to instruct the processor to compare the page count for a specific time interval against the page count for a previous time interval.

12. The device of claim 11, wherein the instructions for determining a timer count further comprise instructions configured to instruct the processor to compare the timer count for a specific time interval against the timer count for a previous time interval.

13. The device of claim 12, further comprising instructions configured to instruct the processor to reset the timer count to zero if the page count difference does not equal zero.

14. The device of claim 12, wherein the instructions for determining the estimated energy consumption of the printing device for each of the plurality of intervals further comprise instructions configured to instruct the processor to:

for each interval where the page count difference does not equal zero, determine a run state energy for the printing device.

15. The device of claim 14, wherein the instructions for determining the estimated energy consumption of the printing device for each of the plurality of intervals further comprise instructions configured to instruct the processor to:

for each interval where the page count difference equals zero, determine a low power state energy for the printing device if the timer count is above a low power state timeout and is below a sleep state timeout.

16. The device of claim 15, wherein the instructions for determining the estimated energy consumption of the printing device for each of the plurality of intervals further comprise instructions configured to instruct the processor to:

for each interval where the page count difference equals zero, determine a sleep state energy for the printing device if the timer count is above the sleep state timeout.

* * * * *